(12) United States Patent
Vajravel et al.

(10) Patent No.: US 11,983,558 B2
(45) Date of Patent: May 14, 2024

(54) MIGRATING APPLICATIONS BETWEEN CONTAINERS DURING MODERN STANDBY

(71) Applicant: Dell Products L.P., Round Rock, TX (US)

(72) Inventors: Gokul Thiruchengode Vajravel, Bangalore (IN); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 368 days.

(21) Appl. No.: 17/391,936

(22) Filed: Aug. 2, 2021

(65) Prior Publication Data

US 2023/0030873 A1    Feb. 2, 2023

(51) Int. Cl.
*G06F 9/46*    (2006.01)
*G06F 1/3212*    (2019.01)
*G06F 9/48*    (2006.01)

(52) U.S. Cl.
CPC ............ *G06F 9/485* (2013.01); *G06F 1/3212* (2013.01); *G06F 9/461* (2013.01)

(58) Field of Classification Search
CPC ......... G06F 9/485; G06F 1/3212; G06F 9/461
See application file for complete search history.

(56) References Cited

U.S. PATENT DOCUMENTS

| | | | |
|---|---|---|---|
| 10,044,640 B1* | 8/2018 | Levine | H04L 47/827 |
| 2015/0019889 A1* | 1/2015 | Banerjee | G06F 1/26 |
| | | | 713/320 |
| 2020/0310867 A1* | 10/2020 | Li | G06F 16/214 |
| 2021/0311527 A1* | 10/2021 | Sumikawa | G06F 1/3212 |
| 2022/0035438 A1* | 2/2022 | He | G06F 1/3228 |
| 2023/0009930 A1* | 1/2023 | Wang | G06F 9/5077 |

* cited by examiner

*Primary Examiner* — Tammy E Lee (74) *Attorney, Agent, or Firm* — Kirton McConkie; Brian Tucker (57) ABSTRACT

Applications can be migrated between containers during Modern Standby on a computing device. This migration may be performed to prolong the battery life of the computing device or to otherwise enhance performance. When a change in sensor state information is detected, a migration policy can be applied to application information to generate migration instructions. The migration instructions can then be used to migrate applications between containers.

20 Claims, 11 Drawing Sheets

| Migration Policy 300 | |
|---|---|
| Scenario | Migration Type |
| RSoC drops below 40% | Group Locally |
| RSoC rises above 40% | Ungroup Locally |
| RSoC drops below 20% | Migrate to Cloud |
| RSoC rises above 40% | Migrate from Cloud |
| ... | |

MIGRATING APPLICATIONS BETWEEN CONTAINERS DURING MODERN STANDBY

CROSS-REFERENCE TO RELATED APPLICATIONS

N/A

BACKGROUND

Figure 1:
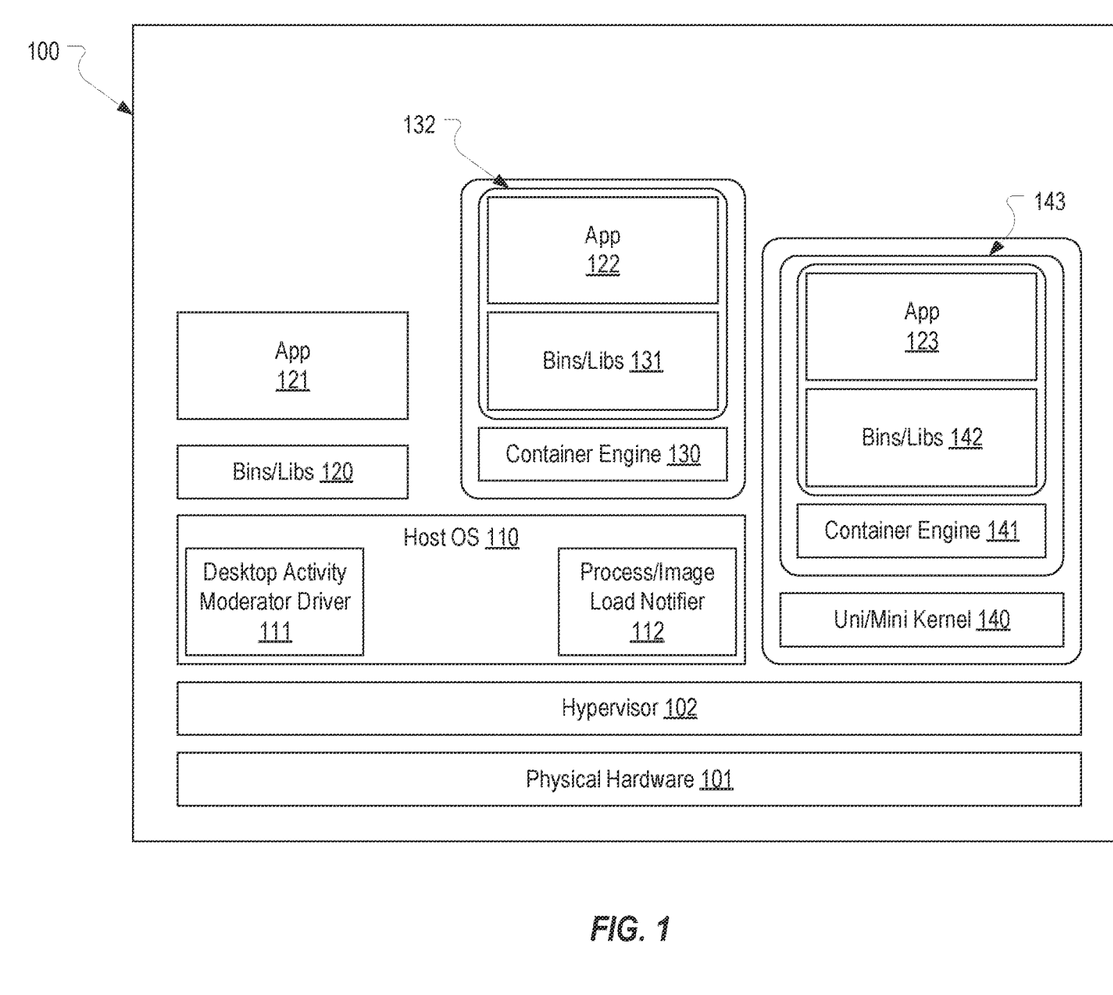
FIG. 1 provides an example of a computing device that enables Modern Standby for supported applications.

Containerization in the computing context refers to a technique for packaging an application and its dependencies into a container to abstract/isolate the application from the underlying host operating system and environment. A number of containerization techniques exist. FIG. 1 represents a computing device 100 that has physical hardware 101, a hypervisor 102 and a host operating system 120. Application 121 is an example of an application that is not containerized in that it relies on binaries/libraries 120 to interface directly with host operating system 110.

Application 122 is an example of a containerized application that is hosted in a software container. As represented in FIG. 1, application 122 and its binaries/libraries 131 may be isolated within its own container 132 that is executed via a container engine 130 that runs on host operating system 110. A Docker container is a common example of a software container.

Application 123 is an example of a containerized application that is hosted in a hardware container. As represented in FIG. 1, with a hardware container, a uni/mini kernel 140 may be executed on hypervisor 102. A container engine 141 can then be run on uni/mini kernel 140 to containerize application 123 and its binaries/libraries 142 in its own container 143.

Modern Standby is a power model for systems running the Windows operating system and is intended to provide an instant on/instant off experience similar to a smartphone. A system may transition from the on state (e.g., when the screen is on) to Modern Standby for a number of reasons (e.g., when the user presses the power button, closes a laptop or selects Sleep from the Windows Start menu, when the system idles out, etc.). Many of the details of how the operating system implements Modern Standby are beyond the scope of this disclosure. Of relevance, however, is that supported applications may periodically become active during Modern Standby. For example, an email application may become active to process an incoming email without waking the system from Modern Standby.

Currently, the Windows operating system only provides Modern Standby support to Universal Windows Platform (UWP) applications. In other words, any application that is not a UWP application, such as a desktop application or web/browser-based application, will remain suspended for the duration of Modern Standby. Additionally, if a UWP application is run in a container on the system, Modern Standby will no longer be enabled for the UWP application.

As represented in FIG. 1, to implement Modern Standby support host operating system 110 may include, among other components, a desktop activity moderator (DAM) driver 111 (e.g., DAM.sys in Windows) and a process/image load notifier 112 (or load notifier 112). As part of the DAM phase of Modern Standby, the Windows operating system suspends all non-UWP applications. In particular, when the system is active, DAM driver 111 interfaces with load notifier 112 to identify any application that is loaded. For any non-UWP application that is loaded or any UWP application that is deployed in a container, DAM driver 111 can assign the application to a suspend job object. In contrast, for any UWP application that is loaded, DAM driver 111 can assign the application to a throttle job object. Then, during the DAM phase, all applications identified in the suspend job object will be suspended for the duration of Modern Standby, whereas any application identified in the throttle job object will remain running at reduced activity. Therefore, any desktop application or any application deployed in a container will be assigned to the suspend job object and, as a result, will be suspended during Modern Standby.

Accordingly, after Modern Standby has transitioned through the DAM phase, application 121, which is assumed to be a desktop application running on host operating system 110, will be suspended. Application 122 will also be suspended because host operating system 110 will view container 132 as a desktop application. For example, if container 132 is a Docker container, load notifier 112 will only see the process dockerd.exe rather than application 132's executable. As a result, even though application 132 may be a UWP application, it will be suspended during the DAM phase. Also, because application 123 is running in a hardware container, it will not participate in the Modern Standby support that host operating system 110 provides. As can be seen, even though computing device 100 implements Modern Standby, a limited subset of applications will benefit from it.

U.S. patent application Ser. No. 17/195,383, which is incorporated herein by reference, describes techniques for enabling Modern Standby for unsupported applications. With such techniques, a greater number of applications, and particularly containerized applications, can remain active during Modern Standby. However, when a greater number of applications remain active, battery life will typically be shortened.

BRIEF SUMMARY

The present invention extends to systems, methods and computer program products for migrating applications between containers during Modern Standby on a computing device. This migration may be performed to prolong the battery life of the computing device or to otherwise enhance performance. When a change in sensor state information is detected, a migration policy can be applied to application information to generate migration instructions. The migration instructions can then be used to migrate applications between containers.

In some embodiments, the present invention may be implemented as a method for migrating an application between containers during Modern Standby. In response to a change in sensor state information, migration instructions can be obtained. The migration instructions can then be implemented to migrate an application between containers during Modern Standby.

In some embodiments, the present invention may be implemented as computer storage media storing computer executable instructions which when executed implement a method for migrating an application between containers. A migration policy can be applied to application information and sensor state information to generate migration instructions. The migration instructions can identify one or more applications that are to be moved between containers. The migration instructions can then be implemented by moving the one or more applications between containers.

In some embodiments, the present invention may be implemented as a method for migrating an application between containers during Modern Standby. It can be detected that a remaining battery charge has dropped below a threshold. In response to detecting that the remaining battery charge has dropped below the threshold, a first application can be migrated from a first container into a second container that hosts a second application.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, the term "Modern Standby" will be used in accordance with its standard definition in the Windows operating system context and encompasses Modern Connected Standby (MCS) and Modern Disconnected Standby (MDS). However, the present invention can be implemented on computing devices running other operating systems, and therefore, Modern Standby can be construed as a sleep state in which the computing device periodically wakes to perform software activities (e.g., the S0ix states on an Intel architecture).

Although the description employs Windows-based examples and terminology, embodiments of the present invention should not be construed as being limited to implementation on Windows-based computing devices. To the contrary, other operating systems (e.g., Android and Linux) include components that are functionally similar or equivalent to the Windows-based components described herein. Therefore, the techniques described herein, by which embodiments of the present invention enable applications to be migrated between containers during Modern Standby can be implemented in any operating system environment that supports Modern Standby functionality.

Figure 2:
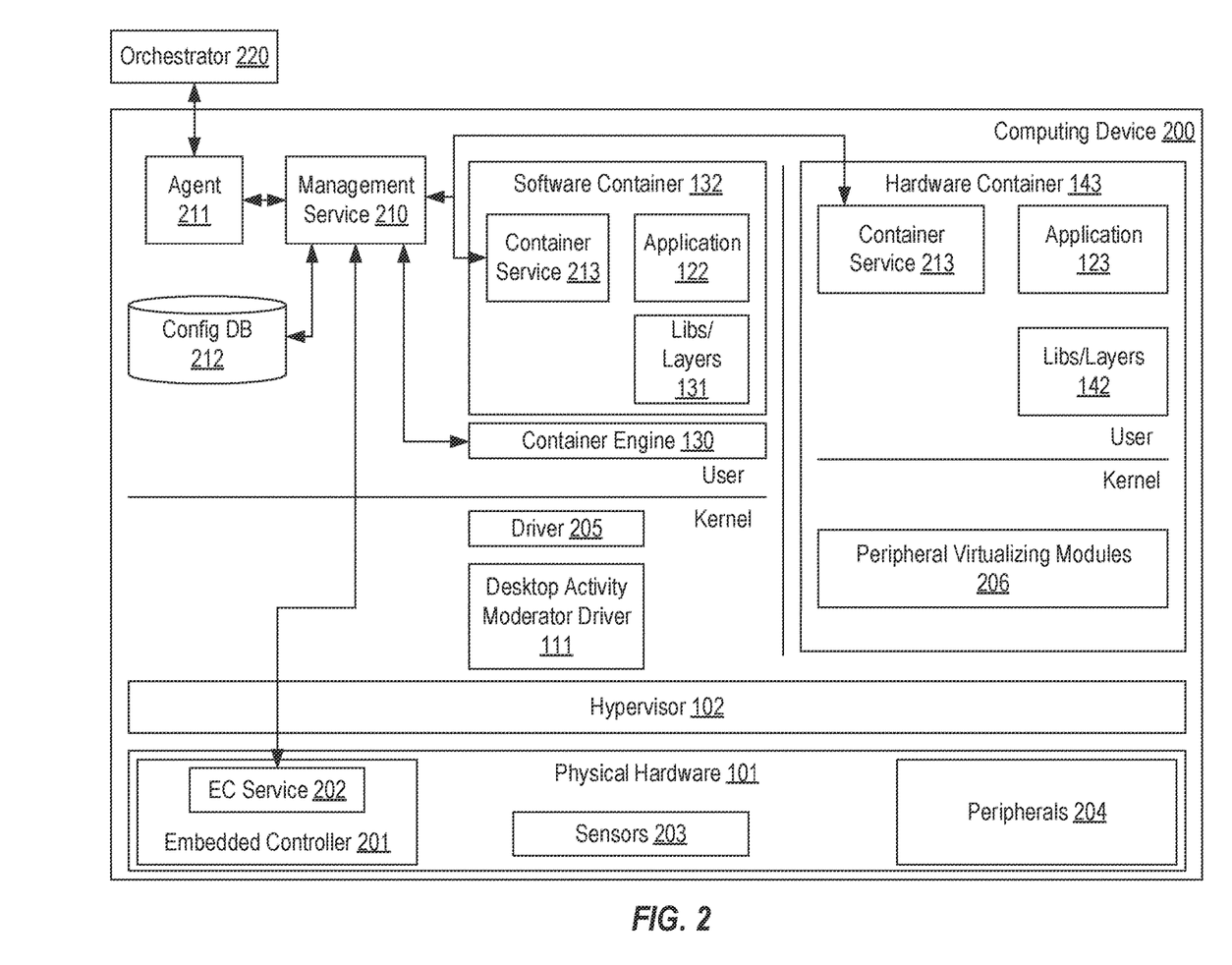
FIG. 2 provides an example of various components that can be included on a computing device to enable applications to be migrated between containers during Modern Standby.

FIG. 2 provides an example of various components that can be employed on computing device 100 to enable applications to be migrated between containers during Modern Standby. As shown, physical hardware 101 may include an embedded controller 201 on which an embedded controller (EC) service 202 is run, one or more sensors 203 and one or more peripherals 204. Sensors 203 can represent a component that reports a battery's remaining capacity, a component that reports the existence or status of a network connection, a component that reports location information (e.g., geofence information), a component that reports thermal measurements, or any other component that may provide information relevant to determining which Modern Standby configuration should be applied to an application.

To enable applications running in hardware containers (e.g., application 123 in hardware container 143) to access peripherals 204, one or more peripheral virtualizing modules 206 may be loaded in each hardware container deployed on computing device 200. Peripheral virtualizing modules 206 can represent components that implement any suitable technique for providing access to peripherals 204 and may interface with components (not shown) outside of hardware container 143 to do so.

As introduced in the background, host operating system 110 can include DAM driver 111 to enable Modern Standby support. Additionally, in accordance with U.S. patent application Ser. No. 17/195,383, a Modern Standby enabler driver 205 (or driver 205) can be used to enable containerized applications that are modern Standby capable to remain active during Modern Standby.

A management service 210 can be configured to run outside of the containers that may be deployed on computing device 200. Management service 210 can interface with a container service 213 that may be deployed in any container deployed on computing device 200 (or at least those that participate in the implementation of embodiments of the present invention). For example, container service 213 can be a background service that is bundled and deployed with any application and its binaries/libraries that are deployed in a container. Although FIG. 2 shows a single software container 132 and a single hardware container 143, any reasonable number of containers may be implemented on computing device 100 at any given time. In some embodiments, management service 210, container service 213 and driver 205 may enable containerized applications to remain active during Modern Standby as described in U.S. patent application Ser. No. 17/195,383.

Management service 210 may employ a configuration database 212 to store "configurations," or information regarding which applications should be managed in accordance with the techniques of embodiments of the present invention (e.g., which applications should be subject to migration during Modern Standby). In some embodiments, an administrator may use a centralized management solution to deliver such configurations to management service 210 via agent 211. Accordingly, agent 211 can function as an intermediary between management service 210 and a centralized management solution (not shown). In some embodiments, an orchestrator 220, which may form part of a centralized management solution, can be used to perform some of the functionality for migrating applications between containers during Modern Standby. Embodiments of the present invention will be described in this context. However, in some embodiments, management service 210 could be configured to perform the functionality that orchestrator 220 is described as performing. In other words, management service 210 could be configured to function in a client/server architecture or a stand-alone architecture.

Figure 3:
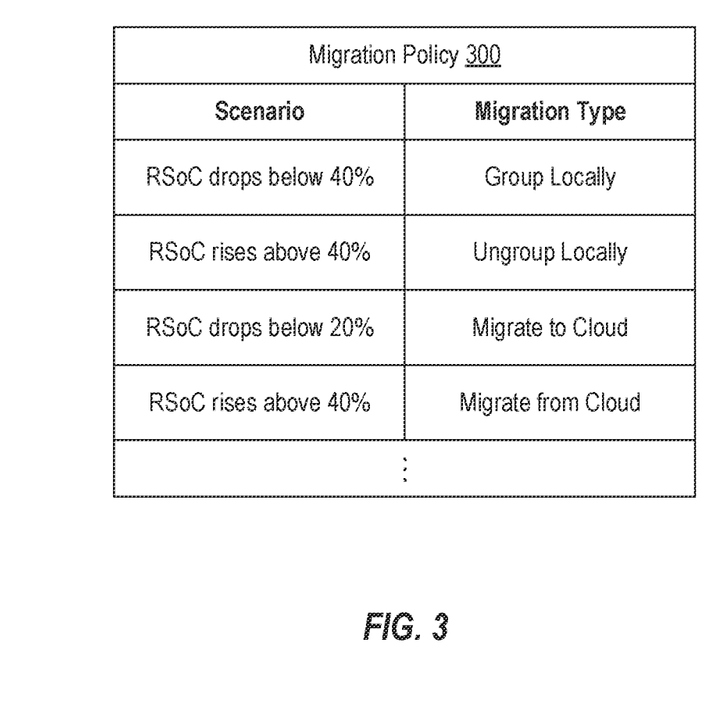
FIG. 3 provides examples of how policies may be configured in one or more embodiments of the present invention.

FIG. 3 provides an example of a migration policy 300 that orchestrator 220 (or management service 210) could use in one or more embodiments of the present invention to determine when to migrate containerized applications and the type of migration to perform. In some embodiments, an administrator may define the content of migration policy 300. Alternatively or additionally, machine learning could be used to define the content of migration policy 300.

As shown, migration policy 300 can identify a number of scenarios and corresponding migration types for the scenarios. A scenario can be defined by some combination of sensor state information. In this context, the term "sensor state information" can encompass any information that EC service 202 may provide about sensors 203 and may oftentimes include a remaining battery charge (RSoC), an indication of whether computing device 200 is plugged in, a network status, location information, thermal information, etc. For ease of illustration, the depicted scenarios in migration policy 300 are based on the RSoC dropping below or rising above a threshold. However, more complex scenarios could be defined. Also, any reasonable number of scenarios could be defined.

Migration policy 300 defines, as an example only, four different migration types: group locally, ungroup locally, migrate to cloud and migrate from cloud. With the group locally migration type, when the RSoC drops below 40%, migration policy 300 dictates that applications that are currently deployed in local containers should be grouped into the same local container. With the ungroup locally migration type, when the RSoC rises above 40% (e.g., when computing device 200 is plugged in and charging or an additional battery is connected), migration policy 300 dictates that applications that are currently grouped in the same local container should be ungrouped into different local containers. With the migrate to cloud migration type, when the RSoC drops below 20%, migration policy 300 dictates that applications that are currently deployed in one or more local containers should be migrated to one or more containers in the cloud. With the migrate from cloud migration type, when the RSoC rises above 40%, migration policy 300 dictates that applications that are currently deployed in one or more cloud containers should be migrated to one or more local containers. Other migration types could be defined, and the same migration type could be assigned to a number of different scenarios. In short, a migration policy could address a wide variety of scenarios and migration types.

Figure 4A:
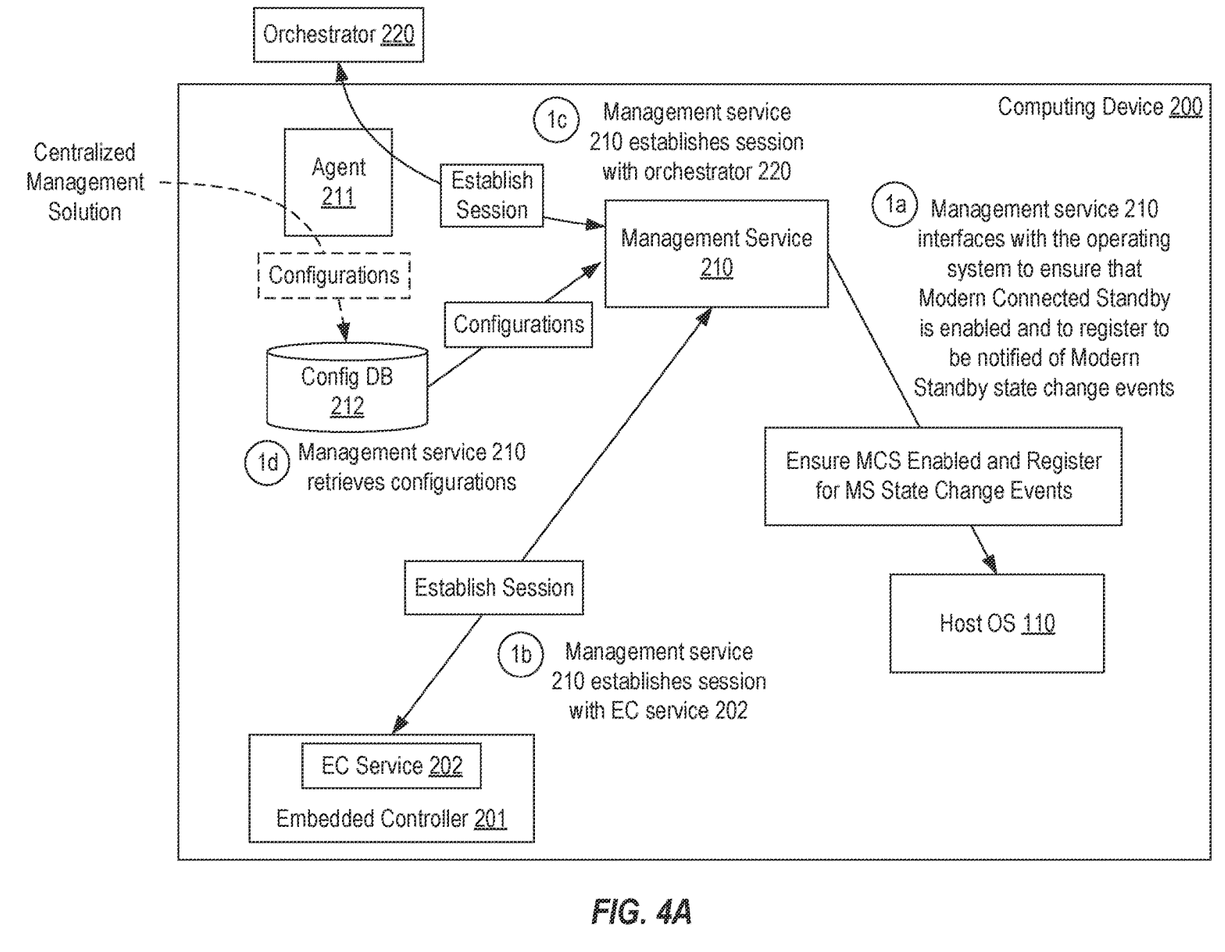
FIGS. 4A and 4B provide an example of functionality that may be performed in one or more embodiments to enable applications to be migrated between containers during Modern Standby.
Figure 4B:
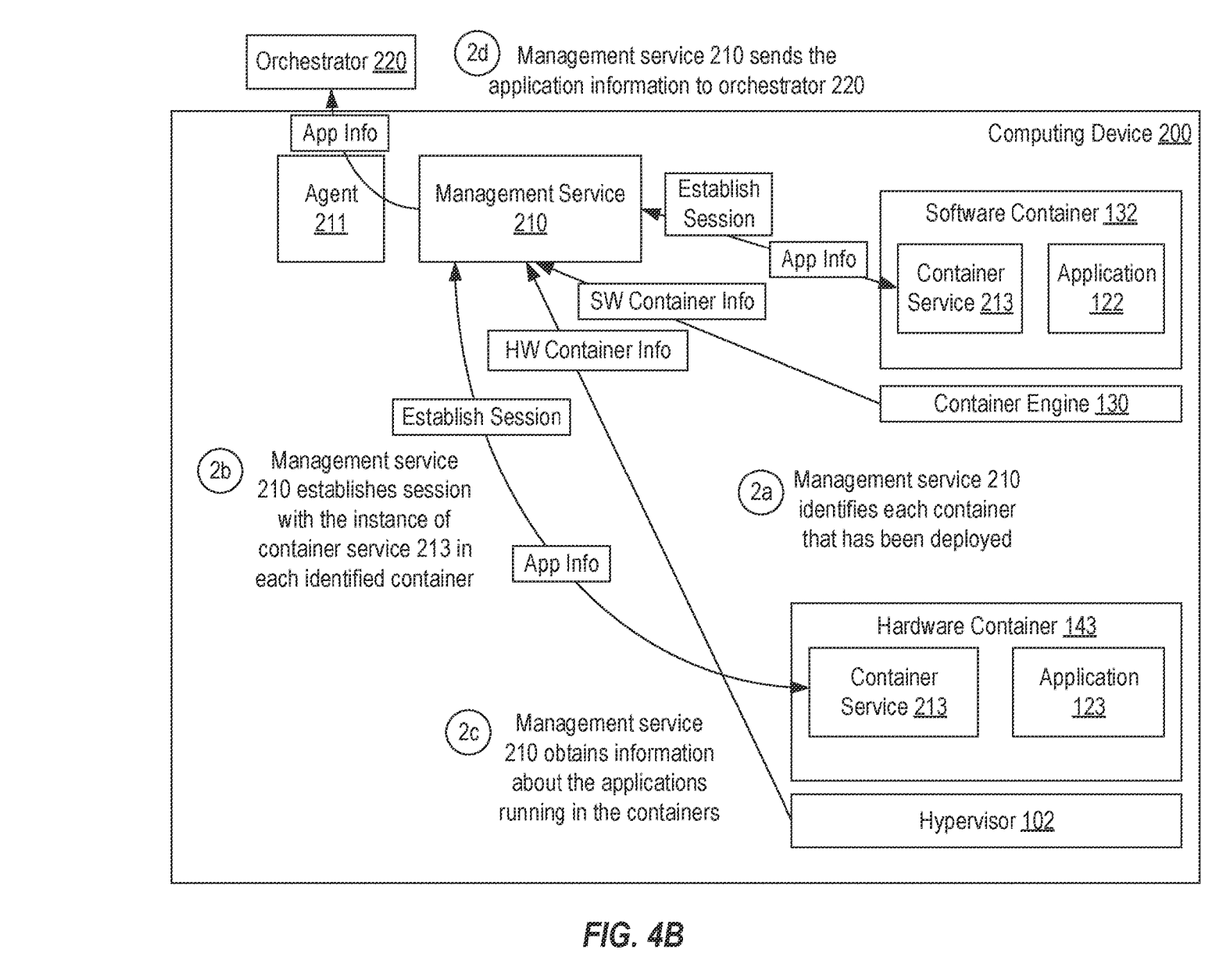

FIGS. 4A and 4B represent functionality that may be performed as part of initialization and/or periodically in preparation for migrating applications between containers during Modern Standby. In FIG. 4A, it is assumed that management service 210 has been loaded on computing device 200. As part of being loaded (or at any other suitable time), management service 210 can perform functionality to enable applications to be migrated during Modern Standby in response to events that occur on computing device 200 (e.g., in accordance with migration policy 300).

In step 1a, management service 210 may interface with host operating system 110 to ensure that Modern Connected Standby is enabled (e.g., via the Powercfg command) and to register to be notified of Modern Standby state change events (e.g., to know when Modern Standby transitions between phases). In step 1b, management service 210 can establish a session with EC service 202. For example, management service 210 may use WMI/ACPI interfaces to register with EC service 202 to receive sensor state information when the state of sensors 203 changes (e.g., to receive the RSoC when it falls below a threshold). In step 1c, management service 210 can establish a session with orchestrator 220 by which these components may communicate as described below.

In step 1d, management service 210 can retrieve applicable configurations from configuration database 212. In some embodiments, agent 211 may be configured to periodically retrieve the current configurations and store them in configuration database 212. In such cases, management service 210 may retrieve the configurations from agent 211 or directly from configurations database 212. In some embodiments, agent 211 could receive the configurations through local input. In some embodiments, agent 211 could receive the configurations from a machine learning solution that dynamically generates the configurations using performance, usage or other information of computing device 200 that agent 210 may provide. In short, the configurations could be generated and provided to management service 210 in many different ways.

Turning to FIG. 4B, in step 2a, management service 210 may interface with container engine 130 and hypervisor 102 (or other hardware container manager) to obtain information for each software container and hardware container respectively that has been deployed on computing device 200. For example, management service 210 could obtain an IP address for software container 132 and for hardware container 143. In step 2b, management service 210 can establish a session with the instance of container service 213 running in each container. For example, using the IP address of software container 132 and the IP address of hardware container 143, management service 210 can establish a session with the instances of container service 213 running in software container 132 and hardware container 143.

In step 2c, management service 210 can use the sessions it has established with the instances of container service 213 to obtain information for any application that is hosted in the respective container. For example, this application information could identify that application 122 is running in software container 132 and that application 123 is running in hardware container 143. In step 2d, management service 210 can send the application information, possibly as augmented by management service 210, to orchestrator 210. In addition to identifying which applications are running in containers on computing device 200, this application information could also include the type of the container in which each application is running (e.g., software or hardware), an identification of any peripherals to which each application has access, a priority of each application, a trust level of each application, a trust level of computing device 200, etc.

Accordingly, after steps 1a-2d have been performed, which need not be performed in the defined order, orchestrator 220 will know how containerized applications are currently hosted on computing device 200, and management service 210 will be configured to receive sensor state information and Modern Standby state change events. Notably, as new containers are deployed or existing containers are stopped or modified on computing device 200, management service 210 can perform steps similar to steps 2a-2d to ensure that orchestrator 220 has the current application information.

FIGS. 5A-5D provide an example of how applications can be migrated in response to a change in sensor state information and in accordance with migration policy 300. This migration process can be performed in various states of Modern Standby including low power states. Notably, different containers may have different power overheads even during Modern Standby. As an example, an application hosted in a hardware container that does not require peripheral access may consume less power than an application hosted in a software container. In contrast, an application hosted in a hardware container that requires access to many peripherals may consume much more power than an application hosted in a software container. The migration techniques of the present invention can be leveraged during Modern Standby to address such power consumption issues and possibly other issues.

Figure 5A:
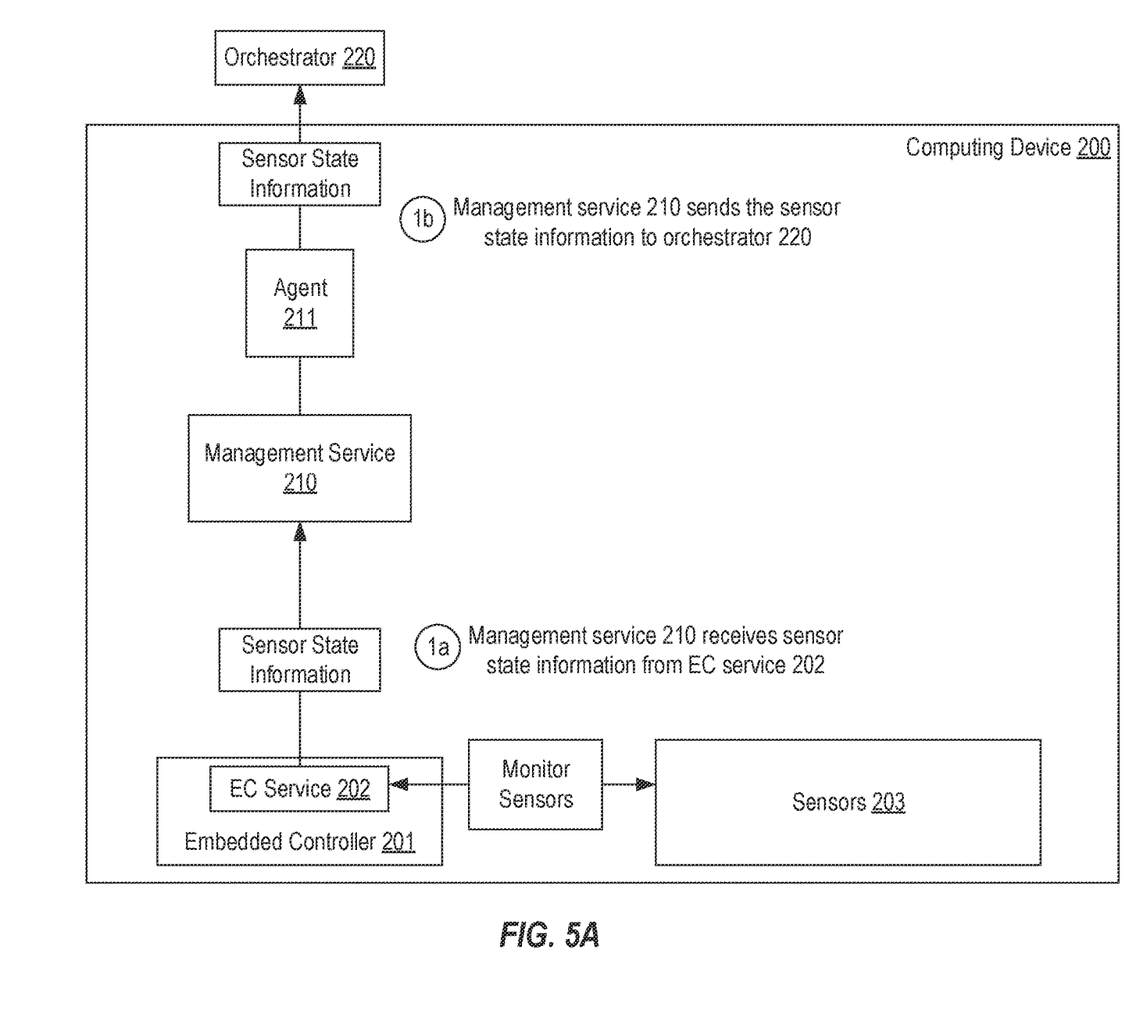
FIGS. 5A-5D provide an example of functionality that may be performed in one or more embodiments during Modern Standby to migrate applications between containers.

Turning to FIG. 5A, it is assumed that computing device 200 is in Modern Standby and is in DC mode (i.e., it is not plugged in). As a result, the periodic activity that occurs during Modern Standby will drain the battery. In this context, EC service 202 can monitor sensors 203. For example, EC service 202 could be configured to periodically read the RSoC of computing device 200's battery and/or periodically obtain/determine any other sensor state information. In step 1a, it is assumed that management service 210 receives sensor state information from EC service 202. For example, EC service 202 may notify management service 210 when the RSoC crosses a threshold, when computing device 200 is plugged in or unplugged, when the location changes, when the network or network status changes, etc. Because EC service 202 runs independently of host operating system 110, EC service 202 will be accessible to management service 210 when management service 210 becomes active during Modern Standby. In step 1b, management service 210 can relay the sensor state information to orchestrator 220 (e.g., via agent 211).

Figure 5B:
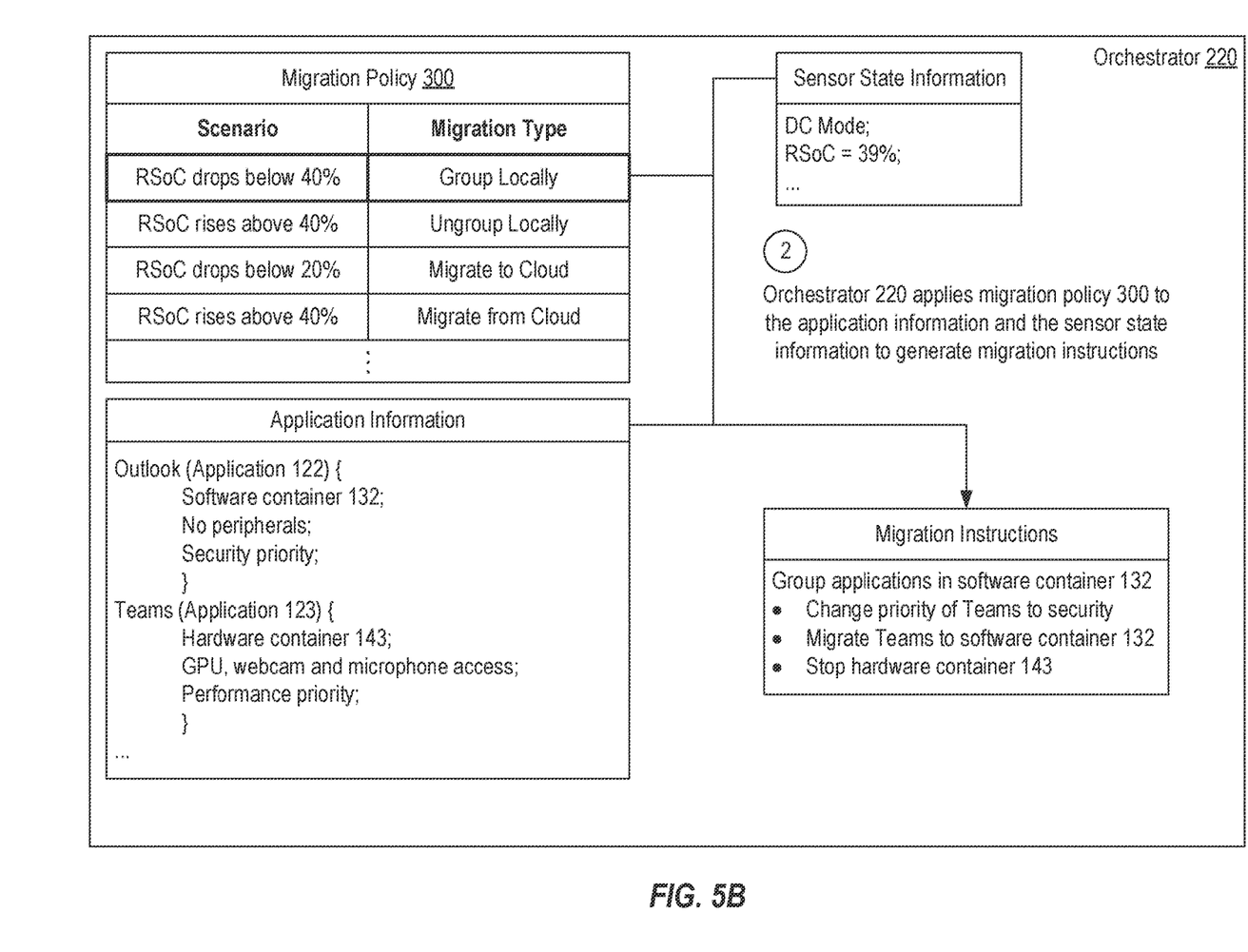

FIG. 5B provides an example of how orchestrator 220 can apply migration policy 300 to application information and sensor state information it has received for computing device 200 to generate migration instructions. As represented in the depicted application information, it is assumed that Outlook is application 122 which is running in software container 132 with no access to peripherals and with an assigned security priority, and that Teams is application 123 which is running in hardware container 143 with GPU, webcam and microphone access and with an assigned performance priority. It is also assumed that the sensor state information indicates the computing device 200 is not plugged in (DC mode) and its RSoC has dropped to 39%. Based on these assumptions, and as represented as step 2, orchestrator 220 can determine that the sensor state information represents the scenario "RSoC drops below 40%" and therefore the migration type of "Group Locally" should be performed. To cause this migration type to be performed, orchestrator 220 can generate migration instructions to provide to management service 210. In this example, these migration instructions may include changing the priority assigned to Teams to security (which matches the security of software container 132), migrating Teams to software container 132 and stopping hardware container 143. In other words, orchestrator 220 can generate migration instructions to cause Outlook and Teams to be grouped into a single container, which in this case is software container 132 with no peripheral access and an assigned security priority. Orchestrator 220 can be configured in any suitable way to determine which migration instructions will accomplish the migration type for a particular scenario.

Figure 5C:
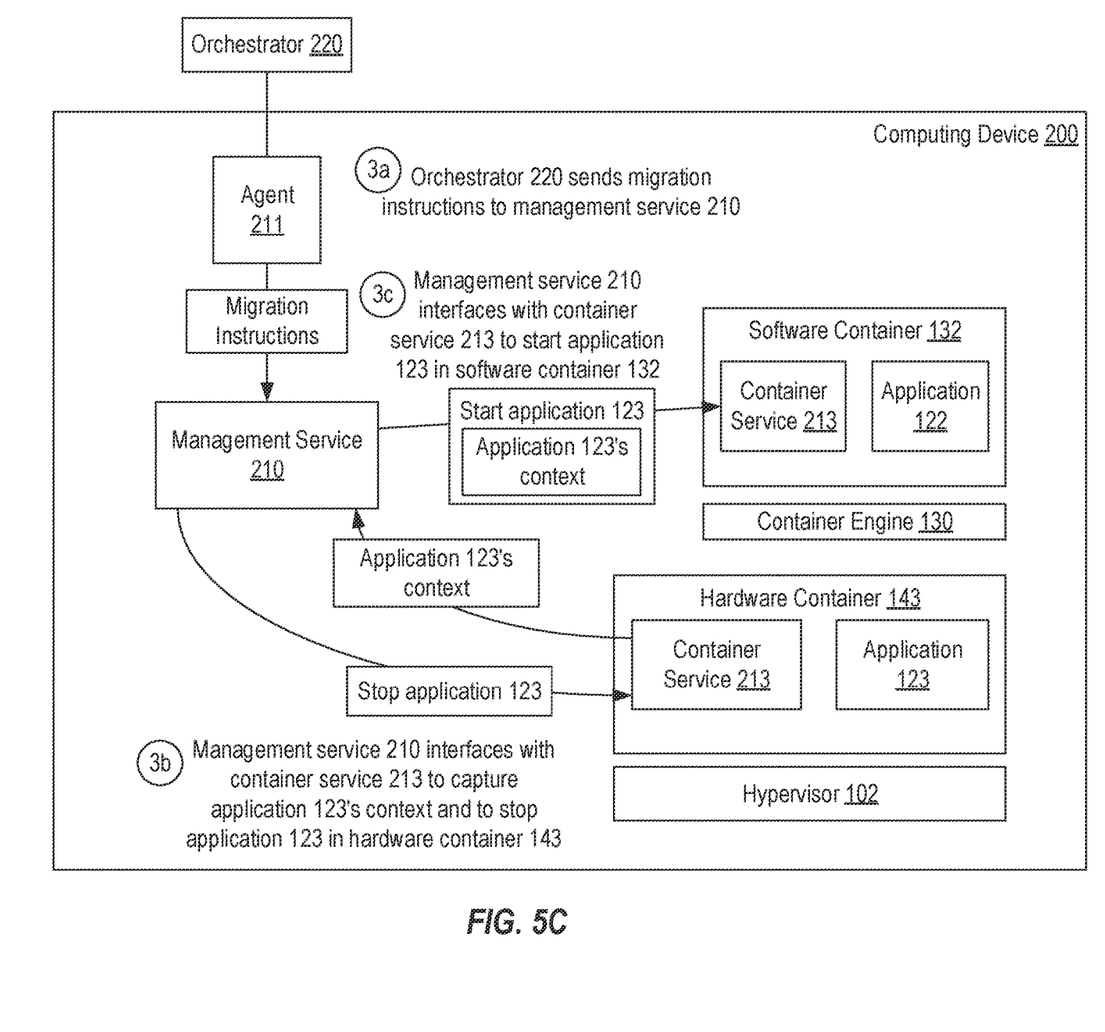

Turning to FIG. 5C, orchestrator 220 can send the migration instructions to management service 210 in step 3a. In response, management service 210 can implement the migration instructions to cause the applications to be migrated between containers during Modern Standby. For example, in step 3b, management service 210 can interface with container service 213 in hardware container 143 to obtain application 123's context and can instruct container service 213 to stop application 123. In step 3c, management service 210 can interface with container service 213 in software container 132 to provide application 123's context and to cause container service 213 to deploy application 123 within software container 132 with the same context.

Figure 5D:
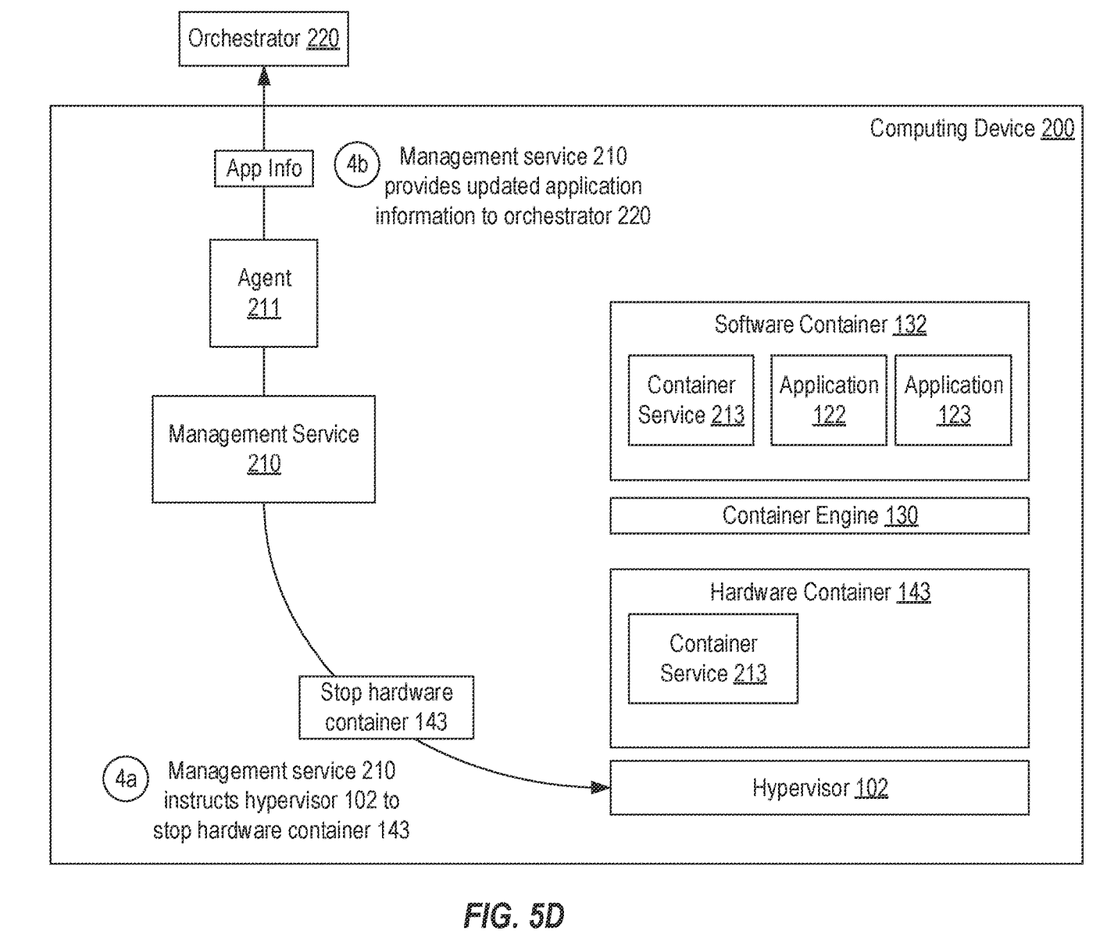

Turning to FIG. 5D, and as a result of steps 3a-3c, application 123 is now hosted in software container 132 with its context maintained and no applications are hosted in hardware container 143. Therefore, in step 4a, management service 210 can instruct hypervisor 102 to stop/kill hardware container 143. Also, in step 4b, management service 210 can provide updated application information to orchestrator 220 so that orchestrator 220 can know that applications 122 and 123 are both running in software container 132 with no peripheral access and with an assigned security priority. Because of this grouping of applications 122 and 123 within software container 132, the battery life of computing device 200 can be prolonged.

After this process, if computing device 200 were plugged in and the RSoC rose above 40%, the migration process could again be performed except that orchestrator 220 could provide migration instructions for ungrouping applications 122 and 123. For example, in such a case, management service 210 could respond to the migration instructions by capturing application 123's context within software container 132 and stopping application 123, creating a hardware container with GPU, webcam and microphone access and an assigned performance priority and deploying application 123 in the hardware container with its context.

Figure 6A:
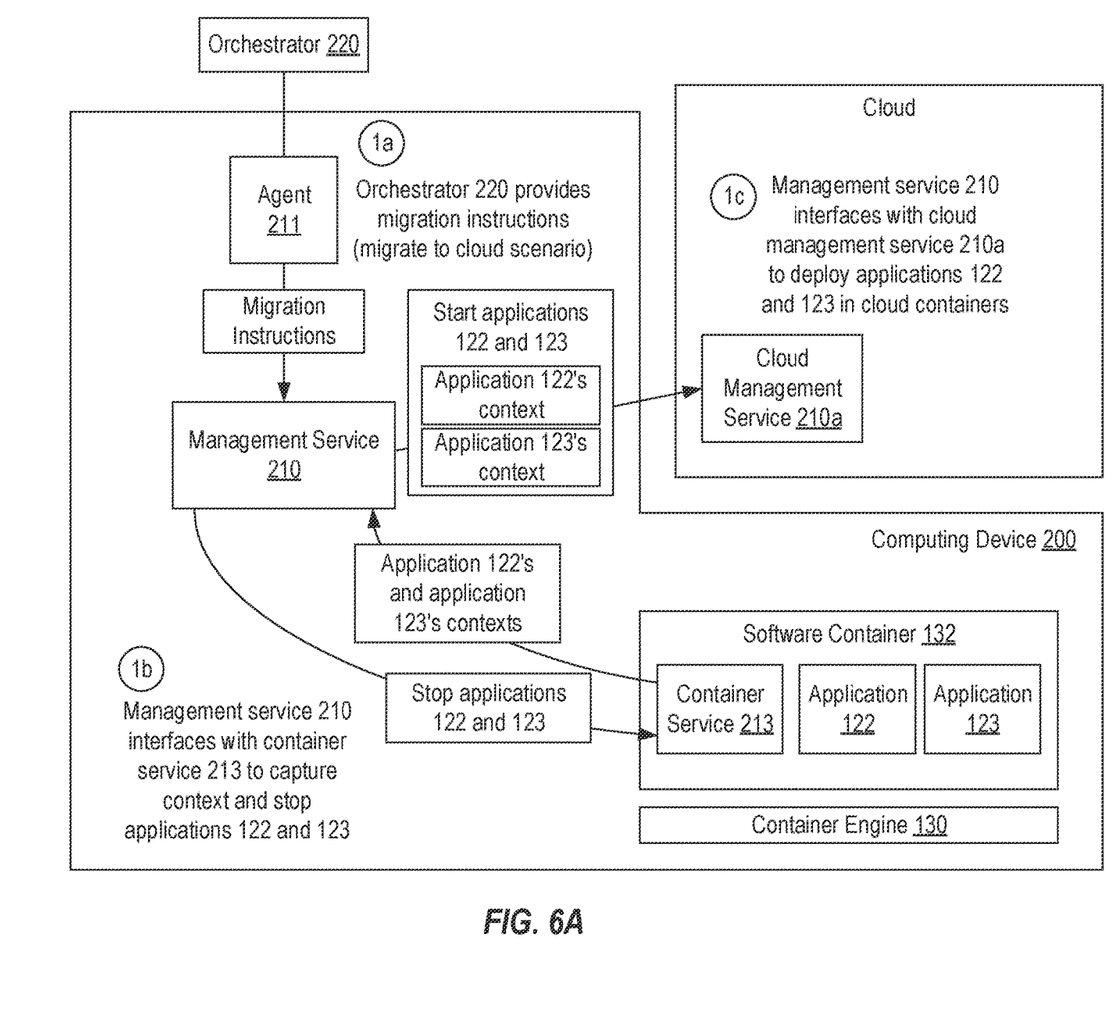
FIGS. 6A and 6B provide another example of functionality that may be performed in one or more embodiments during Modern Standby to migrate applications between containers.
Figure 6B:
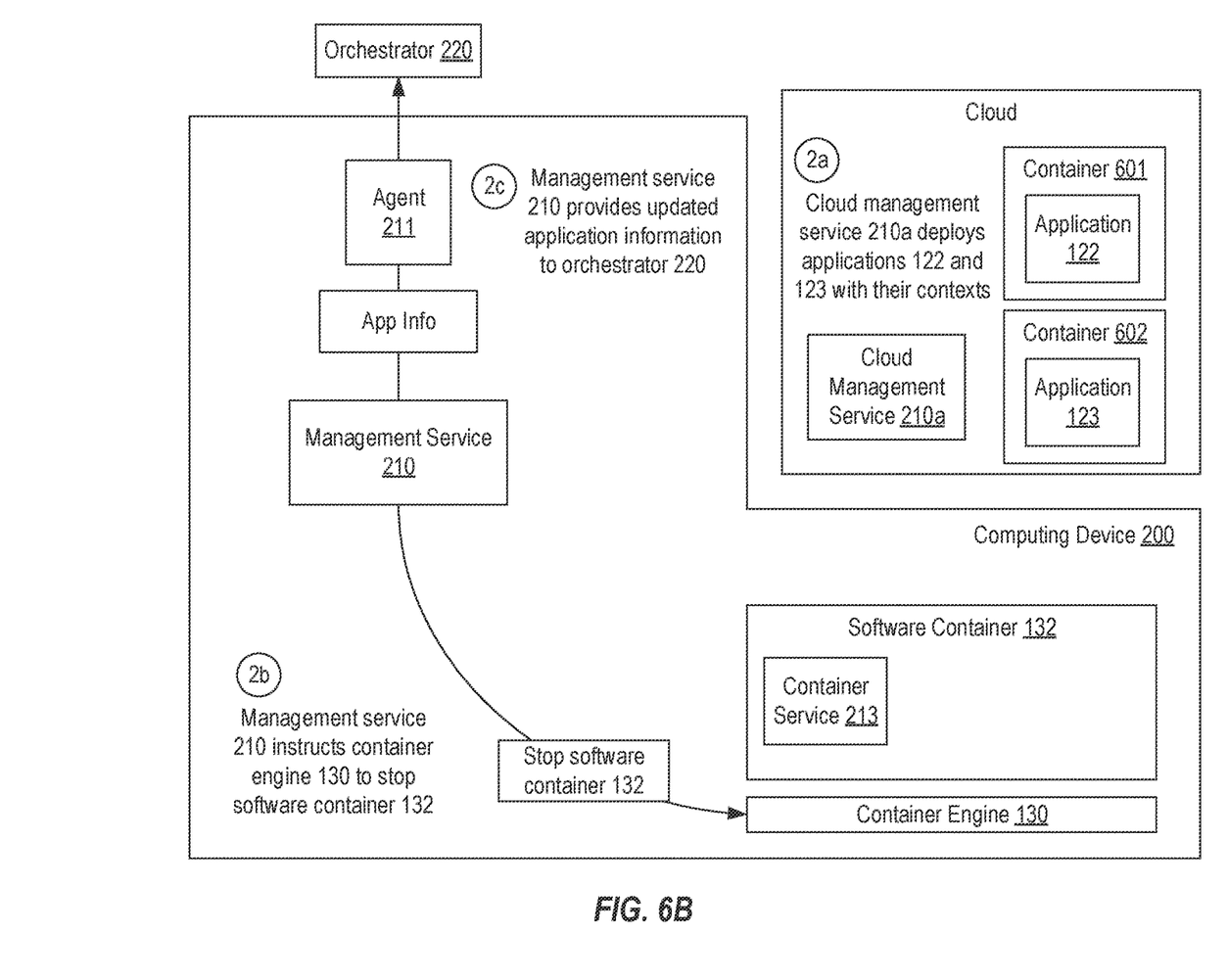

In contrast, if computing device 200 were not plugged in and the RSoC dropped below 20%, the migration process could again be performed to migrate applications 122 and 123 to one or more cloud containers. FIGS. 6A and 6B represent such a scenario.

In FIG. 6A, it is assumed that EC service 202 has provided sensor state information identifying that the RSoC has fallen below 20% and that orchestrator 220 has generated migration instructions accordingly. Then, in step 1a, orchestrator 220 can provide these migration instructions to management service 210. In step 1b, management service 210 can interface with container service 213 in software container 132 to capture the context of applications 122 and 123 and to stop them. In step 1c, management service 210 can interface with a cloud management service 210a to instruct cloud management service 210a to deploy applications 122 and 123 with their contexts in cloud container(s).

Turning to FIG. 6B, in step 2a, cloud management service 210a can deploy applications 122 and 123 with their contexts in cloud containers, which in this example are assumed to be two separate containers 601 and 602. Cloud management service 210a may notify management service 210 once applications 122 and 123 have been successfully deployed. In step 2b, management service 210 can instruct container engine 130 to stop software container 132. Also, in step 2c, management service 210 can send application information to orchestrator 220 so that orchestrator can know that applications 122 and 123 are now hosted in cloud containers. As part of this process, the cloud containers can be configured with peripheral access and an assigned priority in accordance with migration policy 300 and any other applicable policies.

After this process, if computing device 200 were plugged in and the RSoC rose above 40%, the migration process could again be performed except that orchestrator 220 could provide migration instructions for migrating applications 122 and 123 back to computing device 200. For example, in such a case, management service 210 could respond to the migration instructions by interfacing with cloud management service 210a to capture application 122's and application 123's contexts, creating appropriately configured containers on computing device 200 (e.g., with appropriate peripheral access and assigned priority) and deploying application 122 and application 123 with their contexts to the containers.

As can be seen, orchestrator 220 can generate migration instructions that are based on migration policy 300 and account for the current application information and the current state of sensors 203 to thereby attempt to maximize battery life or otherwise enhance the performance of computing device 200 while in Modern Standby. As suggested above, the techniques of the present invention are primarily beneficial on computing devices that implement Modern Standby. However, embodiments of the present invention can be implemented on computing devices that do not support Modern Standby. For example, on a computing device that only supports a legacy S3 sleep state, the techniques of the present invention could be implemented during runtime (e.g., during the s0 state) to improve battery life, to enhance performance and/or security and/or to improve application deployment times.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for migrating a first application between a first container and a second container during Modern Standby, the method comprising:
    detecting that a computing device is in the Modern Standby;
    during the Modern Standby, monitoring sensor state information;
    in response to a change in the sensor state information of the computing device during the Modern Standby, obtaining migration instructions; and
    implementing the migration instructions to migrate the first application from the first container to the second container during the Modern Standby.

2. The method of claim 1, wherein obtaining migration instructions comprises sending the changed sensor state information to an orchestrator and receiving the migration instructions from the orchestrator.

3. The method of claim 2, wherein the orchestrator generates the migration instructions by applying a migration policy to application information and the changed sensor state information.

4. The method of claim 3, wherein the application information identifies multiple applications including the first application and one or more containers including the first container in which the multiple applications are hosted.

5. The method of claim 1, wherein the second container hosts a second application prior to the Modern Standby.

6. The method of claim 1, wherein the first container hosts a second application prior to the Modern Standby.

7. The method of claim 1, wherein the first container is a local container and the second container is a cloud container.

8. The method of claim 1, wherein the first container is a cloud container and the second container is a local container.

9. The method of claim 1, wherein implementing the migration instructions comprises migrating one or more additional applications between containers during the Modern Standby.

10. The method of claim 1, wherein migrating the first application from the first container to the second container during the Modern Standby comprises modifying a configuration of the second container.

11. The method of claim 1, wherein migrating the first application from the first container to the second container during the Modern Standby comprises stopping the first container.

12. The method of claim 1, wherein migrating the first application from the first container to the second container during the Modern Standby comprises preserving a context of the first application.

13. The method of claim 1, wherein the change in the sensor state information comprises a change in a remaining charge of a battery of the computing device.

14. The method of claim 1, further comprising:
in response to a second change in the sensor state information, obtaining second migration instructions; and
implementing the second migration instructions to again migrate the first application from the second containers to a different container during the Modern Standby.

15. One or more computer storage media storing computer executable instructions which when executed implement a method for migrating one or more applications between a first set of one or more containers and a second set of one or more containers during Modern Standby, the method comprising:
obtaining sensor state information for a computing device that is in the Modern Standby;
obtaining application information for the one or more applications that are hosted in the first set of one or more containers on the computing device during the Modern Standby;
during the Modern Standby, applying a migration policy to the application information and the sensor state information to generate migration instructions, the migration instructions identifying the one or more applications that are to be migrated to the second set of one or more containers; and
during the Modern Standby, implementing the migration instructions by migrating the one or more applications from the first set of one or more containers to the second set of one or more containers.

16. The computer storage media of claim 15, wherein the one or more applications comprise multiple applications.

17. The computer storage media of claim 15, wherein:
the second set of one or more containers is a single local container;
the first set of one or more containers is a single local container;
the first set of one or more containers is one or more local containers and the second set of one or more containers is one or more cloud containers; or
the first set of one or more containers is one or more cloud containers and the second set of one or more containers is one or more local containers.

18. The computer storage media of claim 15, wherein the sensor state information comprises a remaining charge of a battery of the computing device.

19. The computer storage media of claim 15, wherein the application information identifies the first set of one or more containers.

20. A method for migrating one or more applications between a first set of one or more containers and a second set of one or more containers during Modern Standby, the method comprising:
obtaining sensor state information for a computing device that is in the Modern Standby;
obtaining application information for the one or more applications that are hosted in the first set of one or more containers on the computing device during the Modern Standby;
during the Modern Standby, applying a migration policy to the application information and the sensor state information to generate migration instructions, the migration instructions identifying the one or more applications that are to be migrated to the second set of one or more containers; and
during the Modern Standby, implementing the migration instructions by migrating the one or more applications from the first set of one or more containers to the second set of one or more containers.

* * * * *